Figure 1:
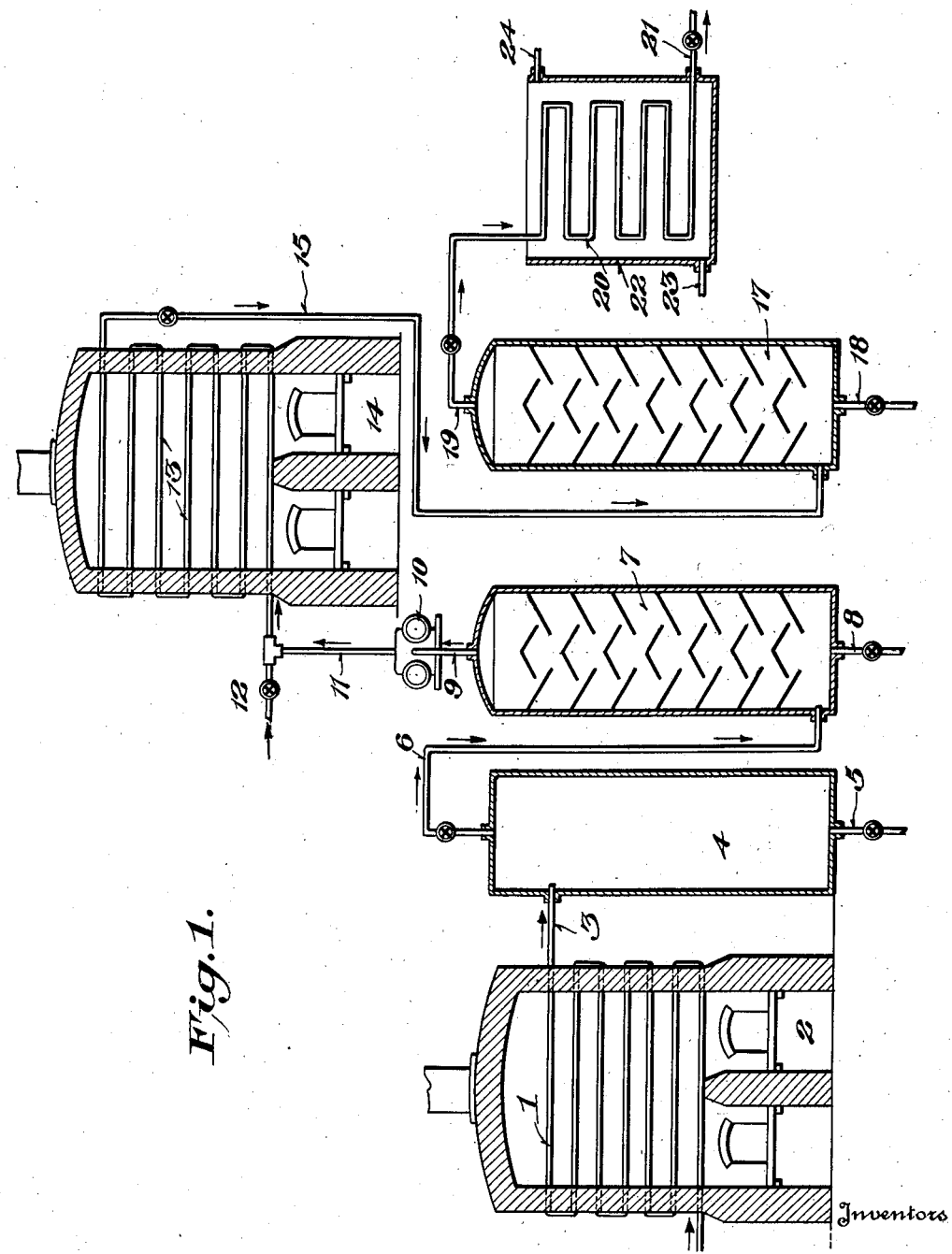

July 17, 1934. D. R. STEVENS ET AL 1,966,467
DEGUMMING AND STABILIZING LOW BOILING HYDROCARBONS
Filed May 5, 1930 2 Sheets-Sheet 1

Inventors
Donald R. Stevens,
William A. Gruse,
Attorney

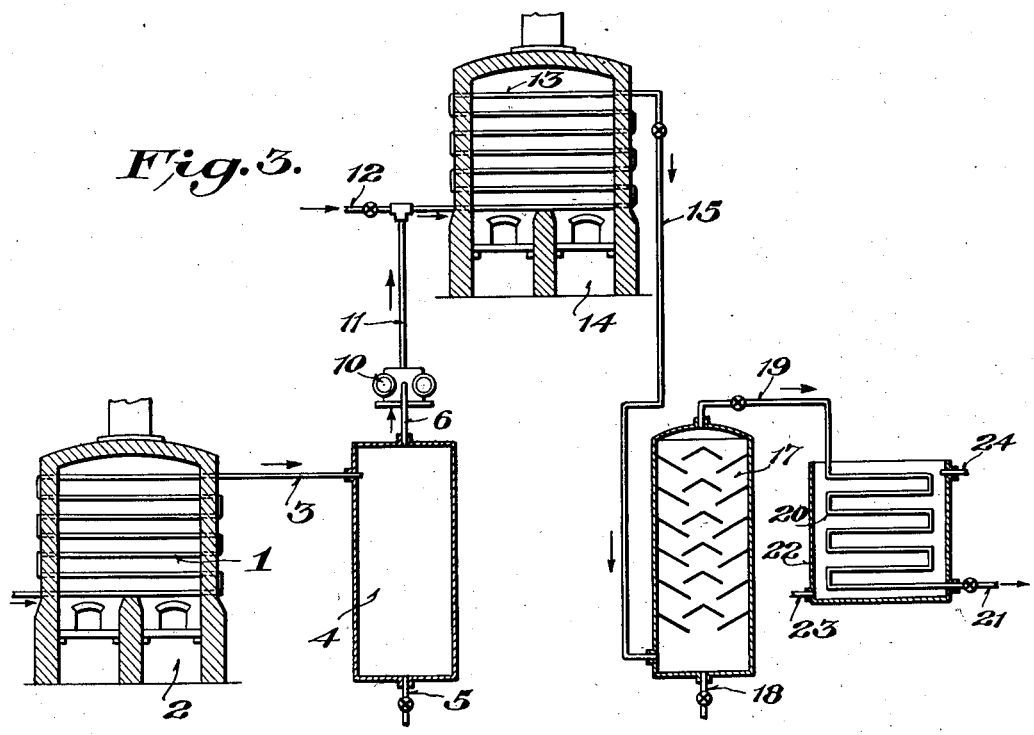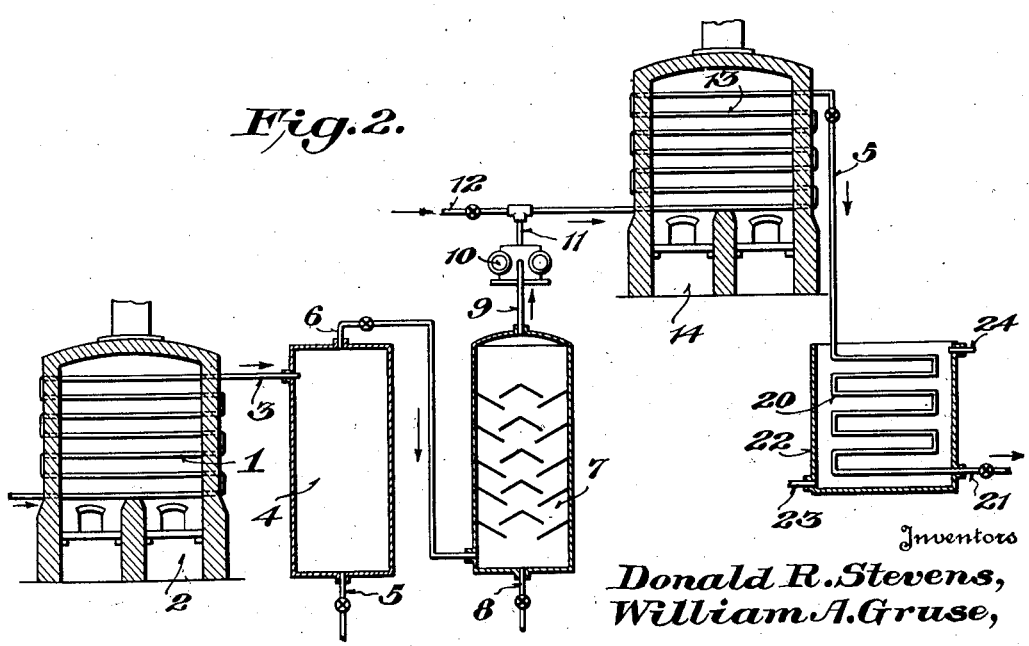

Patented July 17, 1934

1,966,467

UNITED STATES PATENT OFFICE 1,966,467

DEGUMMING AND STABILIZING LOW-BOILING HYDROCARBONS

Donald R. Stevens, Pittsburgh, and William A. Gruse, Wilkinsburg, Pa., assignors to Gulf Refining Company, Pittsburgh, Pa., a corporation of Texas Application May 5, 1930, Serial No. 450,053

12 Claims. (Cl. 196—93)

This invention relates to degumming and stabilizing low-boiling hydrocarbons such as gasoline and the like and it comprises a process of freeing such low boiling hydrocarbons of the bodies which form gum on standing or storage, wherein vapors from a cracking still either prior or subsequent to dephlegmation are subjected to heat and pressure for a brief period of time, and then condensed, the condensate being fractionated and treated in the usual manner to form the desired low-boiling hydrocarbons; all as more fully hereinafter set forth and as claimed.

One of the objections to commercial gasoline made by cracking processes is the liability to the development of "gum" in standing or storage. While there is not an appreciable amount of gum present in freshly cracked pressure still distillate, it develops in such distillate or in the gasoline fractionated from it. In use of the gasoline in engines this gum is annoying. It is left as a residue on evaporation of the gasoline. Redistillation does not free the gasoline of this formed gum since the redistilled clear gasoline may still contained gum and will develop further gum on longer storage. Nothing is known as to the nature of the bodies yielding gum in gasoline nor as to the action by which it is formed; but it is assumed that its formation is due to a polymerization and that in all probability doubly unsaturated olefins or cyclic olefins are responsible. In polymerization, oxidation, seems to accelerate the action. In all events, with access of air gasoline is more prone to develop gum.

In the usual method of making gasoline in a cracking still the vapors leave the still and pass through a dephlegmator which condenses the higher boiling portions. Vapors leaving the dephlegmator go to a condenser and furnish a distillate from which gasoline is obtained. such gasoline usually being treated with acid and the like. The cracking apparatus may work under a variety of conditions. Sometimes the oil is cracked in the liquid phase and sometimes it is cracked in the vapor phase, and the pressure may vary extremely. Ordinarily, in modern cracking apparatus there is some degree of superatmospheric pressure, and the temperature may reach a high degree. The pressure in the cracking zone may or may not extend through the dephlegmator and through the condenser.

We have found it is possible to make a final condensate of stabilized character and substantially free from gum or gum-forming bodies by subjecting the vapors from a cracking still to a high temperature and advantageously to a high pressure before their final condensation. Pressures around 1000 pounds are advantageous and temperatures usually somewhat lower than that of the formation of the cracked vapors are satisfactory. The time of heating may vary all the way from 5 to 30 minutes depending to some extent upon the stocks treated as well as upon the temperatures employed. In different types of cracking apparatus the cracking temperatures vary and the pressure of the vapors at different points from the cracking zone to the final condensing zone vary. We may subject the vapors coming immediately from the cracking still to a lower temperature than that under which they emerge, prior to a dephlegmation treatment and prior to a final condensation, or we may reheat the vapors after they have been dephlegmated and prior to their final condensation.

Time and temperature are more or less reciprocal in this process. With a low temperature the time of treatment is somewhat longer than with a high temperature and, since we have found that the presence of high-boiling fractions in the vapors influences the process, the time and temperature also are somewhat dependent upon the particular character of the vapors being reheated. Where the vapors contain high-boiling constituents the heat treatment is usually shorter. The presence of the higher-boiling constituents seems to accelerate the degumming and stabilizing action. These higher-boiling constituents are present prior to the dephlegmation in the usual cracking processes; and therefore when we reheat the vapors prior to dephlegmation we have found that the heat treatment need not be so long as where the vapors are reheated subsequent to dephlegmation and prior to their final condensation.

This being so, is is advantageous under certain conditions to augment the amount of heavy ends in the vapors treated, and this may be done by returning to the vapors undergoing treatment some of the heavier ends separated from the pressure still distillate after it is finally fractionated.

In addition to the heat treatment of the vapors for the purpose of stabilizing and degumming them, it is necessary to subject them to pressure. We have found that the higher the pressure the quicker and the more certain is the process of degumming, but that ordinarily pressures over 1000 pounds are not necessary. When the vapors are at a temperature of between 700° and 800° F. a pressure of between 500 and 1000 pounds is satisfactory, but better results are obtained at pressures in the neighborhood of 1000 pounds.

Any convenient means or apparatus may be used for reheating the vapors and subjecting them to the stated pressures prior to their final condensation. A simple coiled pipe with heating means is convenient, or where the time factor enters large insulated chambers or heated chambers may be used. A simple coil preceding the large chamber is satisfactory. An arrangement whereby a heated coil delivers into a large chamber is satisfactory. The coil should not be heated to such a temperature that the vapors are recracked, nor should the chamber, if used, hold the vapors at a high enough temperature for a sufficient length of time to result in any substantial cracking.

In a typical embodiment of our invention, vapors coming from an ordinary type of cracking apparatus are dephlegmated in the usual way and the emerging vapors which now may be at a temperature of about 500° F. are compressed by means of a usual compressor and immediately delivered under such pressure to a heated coil and maintained in that coil during their passage therethrough at a temperature of about 770° F. The pressure during heating is best around 1000 pounds, and the length of the coils is such as regards the capacity of the apparatus that the vapors shall be maintained under the stated pressure and temperature for a period of about 30 minutes. In this embodiment of the invention no chamber is used, but more specifically we may use a shorter coil and deliver the vapors from the coil under the stated pressure and temperature to a large chamber where they will remain for a sufficient length of time to insure that they shall be under the stated pressure and temperature for about 30 minutes. The products from the heating coil (or the chamber if used) are condensed under the stated pressure, the pressure is then released and the distillate is fractionated in the usual way. The gasoline so produced is not only free of gum but is stabilized to the extent that the ordinary refining is not required and even though stored for a long period of time gum does not form. In substance potential gum has been removed.

Since the vapors from various types of cracking processes vary, as stated, the typical embodiment is to be considered merely as an example and is not in any way a limitation of our process. Ordinarily, the reheating of the vapors is at a temperature and under conditions preventing further cracking. The temperature may approach the temperature used in the formation and production of such vapors and the pressure to which the vapors are resubjected in our process when they come from a pressure cracking operation may be substantially higher than the pressure of their formation and production. Three hundred pounds pressure on vapors from a cracking still which is operated at from 100 to 300 pounds pressure gives fairly satisfactory results, but more permanent results have been secured when the pressure treatment of such vapors has gone as high as 1000 pounds. Similarly, when the vapors produced by a cracking process at pressures of 100 to 300 pounds and at temperatures between 800 and 900° F. are treated by our process, temperatures below 800° are satisfactory—usually temperatures between 700° and 800°. Of course, in determining the best temperature and pressure the time element must be considered, as before stated.

In another embodiment of our invention, vapors coming from an ordinary type of cracking apparatus which has been run at 250 pounds pressure and at a temperature of 850° to 900° F. are, before dephlegmation, compressed to about 1000 pounds and passed through a heated coil and heated to a temperature of 790° F. Pressure for this treatment is higher than the pressure of the formation of the vapors and the temperature of the reheat is lower than the temperature of the formation of these vapors. Since the vapors so reheated under the stated pressure contain higher-boiling fractions than fractions producing gasoline, the time of treatment is materially shorter than in the example previously given. Ten minutes treatment under conditions noted will be found to be sufficient. The products from the heating coil are condensed, the pressure is released and the gasoline fractions obtained in the usual way. It is, of course, possible both in this example and the previous embodiment described to release the pressure on the vapors before the final condensation.

In still another embodiment of our invention we may treat the vapors from a cracking still after they have been dephlegmated as in the process described in the first example but may add to those vapors prior to their delivery to the coil about 20 per cent of higher-boiling oil, preferably that remaining as residual oil from the final fractionation of the pressure still distillate to obtain gasoline. This higher-boiling oil may be added to the coil as vapor or as liquid, being previously put under sufficient pressure for the purpose.

Our invention, in so far as it involves sequence of steps is illustrated by the accompanying drawings. The drawings comprise Figs. 1, 2, and 3, each of which is in elevation, schematically represented. The same reference numerals refer to the same elements in each figure.

Referring to Fig. 1, an ordinary cracking coil 1, is positioned in a furnace 2. The cracking coil 1 discharges through line 3 into a common separating chamber 4. Any liquid residuum is drawn off through the valved line 5 and separated vapors leave the separating chamber 4 through valved line 6 and are conducted by that line to a dephlegmator 7. The dephlegmator 7 is provided with a valved drawoff 8 for condensate, and the uncondensed vapors are conducted away through line 9 to a compressor 10. On being compressed to the desired pressure the vapors then proceed through line 11 to coil 13 wherein they are brought to and maintained at the desired temperature as elsewhere described. After being treated at the elevated temperature and pressure in coil 13 the vapors are conducted through valved line 15 to a subsequent dephlegmator 17 wherein they are subjected to final dephlegmation. The dephlegmator 17 is provided with a valved drawoff 18 for condensate and with a valved conduit 19 for conducting the uncondensed vapors to condenser coil 20. The final condensate leaves the system through valved line 21. The final condenser comprises a coil 20 situated in a water container 22, which container is provided with water inlet 23 and water outlet 24.

Fig. 2 shows a second embodiment of the invention. The description of Fig. 1 is directly applicable to Fig. 2 except that the second dephlegmator 17 is done away with in Fig. 2 and the vapors treated in coil 13 proceed through line 15 directly to the condenser 20. In this embodiment of our invention the material being processed is dephlegmated prior to treatment in the coil 13 but is not dephlegmated again prior to final condensation. This embodiment of our invention is particularly adaptable to the treatment of distillates which are to be finally fractionated at a later time.

Fig. 3 shows a third embodiment of our invention. The material undergoing treatment is here passed through a cracking coil 1 adjacent a furnace 2 and is conducted from the cracking coil through line 3 into separating chamber 4. The separating chamber 4 is provided with a valved connection 5 for withdrawing liquid matter and it is provided with an outlet connection 6 for conveying the separated vapors to a compressor 10. The vapors are there compressed to the desired pressure and discharged through line 11 to the coil 13 wherein they are maintained at the desired temperature. The coil 13 is positioned in a furnace 14 where necessary heat can be generated. The valved line 15 conveys the treated vapors from coil 13 to the dephlegmator 17 wherein they dephlegmated and then conveyed through line 19 to the final condenser 20. The description of Fig 1 is directly applicable to Fig. 3 except that in Fig. 3 the vapors go through line 6 to compressor 10 directly from the separating chamber 4, not being subjected to any dephlegmation prior to compression.

In all three figures, if the pressure in elements 1 and 4 is sufficient to maintain the necessary pressure in coil 13, the compressor 10 may be by-passed. For the purpose of simplification, the by-pass has been omitted from the drawings.

The valves in lines 6, 15, 19 and 21 may be used to regulate the pressure in the different portions as desired. The valves on lines 5, 8 and 18, of course, are so operated as to maintain the desired pressure. In all three figures the line 11 conducting compressed vapors to the coil 13 is provided with a valve connection 12 at which point the separated heavy ends from 18 may be returned. These returned ends, as elsewhere described, may be those made simultaneously or may be left over from previous operations, and may be introduced at 12 either as liquid or vapor.

As previously described, the cracking coil 13 may be supplemented by an insulated or heated chamber, when the time factor becomes substantial. In such case the chamber is positioned immediately after coil 13 on the higher pressure side of the valve in line 15. It is a simple element which in fact is a mere substitute for a more extended coil, and it has been omitted from the drawings for purpose of simplification.

As stated, the reheating temperature depends upon circumstances. Something depends on the type of oil under treatment and on the amount of unsaturation of the cracked vapors obtained. In a general way, the greater the amount of unsaturation of the hydrocarbons vaporized the less is the necessary reheating temperature. If the cracking still is operated at a sufficiently high pressure it may not be necessary to superimpose a pressure on the vapors when they are reheated for degumming in accordance with our process.

The vapors can be taken from that point in the dephlegmator where they are at the proper degumming temperature and subjected to the proper degumming pressure and then dephlegmated or fractionated again. Usually in the operation of a pressure still there is a temperature gradient at some point prior to the dephlegmator outlet, say from 900° to 500° F. In this gradient is a temperature favorable to the degumming of the cracked distillate. As stated, the vapors can be removed from the dephlegmator at a point where they are at a proper degumming temperature—say 770° F.—and their pressure raised to 1000 pounds or thereabouts, held at that temperature for say 30 minutes, and then returned to the dephlegmator at another point or to another dephlegmator or fractionating tower.

What we claim is:

1. The process of producing degummed and stabilized pressure still distillate which comprises subjecting vapors from a cracking distillation to a high temperature below cracking temperatures and to a pressure of about 1000 pounds for a period somewhat over 5 minutes.

2. In the production of degummed and stabilized gasoline, the process which comprises reheating separated and as yet uncondensed vapors from a cracking still to a temperature of 750° F. for a period of about ten minutes prior to their final condensation, while maintaining them under pressures of from 300 to 1000 pounds per square inch.

3. In the production of degummed and stabilized gasoline, the process which comprises reheating under high pressure the vapors from a cracking still to a temperature between 700° and 800° F. for a period ranging from about ten to five minutes prior to their final condensation.

4. In the production of degummed and stabilized gasoline, the process which comprises reheating the vapors from a cracking still to a temperature between 700° and 800° F. for a period of from five to thirty minutes and at a pressure of about 1000 pounds, prior to the final condensation of said vapors.

5. In the degumming and stabilizing of pressure still distillate, the process which comprises partially cooling vapors from a cracking still, reheating the uncondensed vapors from such partial cooling to a temperature somewhat below cracking temperatures and while reheated subjecting them to a high pressure for from ten to thirty minutes, and finally condensing them.

6. In the production of degummed and stabilized gasoline, the process which comprises reheating the vapors from a cracking still prior to their condensation to a temperature above 700° F. and for a short period but not less than five minutes, the heating being under high pressure and the period of heating being for a longer time with vapors containing small amounts of heavy ends and for a shorter time with vapors containing a larger amount of heavy ends.

7. In the production of degummed and stabilized gasoline, the process which comprises reheating vapors from a cracking still prior to their final condensation under conditions of high temperature and high pressure, the temperature not exceeding that of their formation, and maintaining the vapors at such temperature for a period of time not substantially less than five minutes and inversely proportional to the relative temperature.

8. In the production of degummed and stabilized gasoline, the process which comprises subjecting the vapors from a pressure cracking still to a heat treatment at temperatures slightly below those required for cracking, under high pressures and for a period of time, not over 30 minutes, sufficient to substantially eliminate gum from the resulting products, and recovering gasoline from the products of said heat treatment.

9. The process of claim 8 wherein the temperatures employed range from about 500° to 800° F.

10. The process of claim 8 wherein the period of heating is between 5 and 30 minutes.

11. The process of claim 8 wherein the pressures employed during the heat treatment range from about 300 to 1000 pounds per square inch.

12. In the production of degummed and stabilized gasoline, the process which comprises subjecting the vapors from a pressure cracking still to a heat treatment lasting from about 5 to 30 minutes, at temperatures from 500° to 800° F. and at pressures of from 300 to 1000 pounds per square inch.

DONALD R. STEVENS.
WILLIAM A. GRUSE.